Mar. 6, 1923.

L. W. GREVE

BLOWGUN

Filed Jan. 7, 1920

1,447,546

Patented Mar. 6, 1923.

1,447,546

UNITED STATES PATENT OFFICE.

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

BLOWGUN.

Application filed January 7, 1920. Serial No. 349,944.

*To all whom it may concern:*

Be it known that I, LOUIS W. GREVE, a citizen of the United States, residing at Cleveland, in the county of Cuyahoga and State of Ohio, have invented a certain new and useful Improvement in Blowguns, of which the following is a full, clear, and exact description.

This invention relates to what is known in the trade as blow-guns, consisting essentially of a nozzle-like member to which an air hose may be attached and containing a valve by which air can be discharged from the outlet end in a strong stream for cleaning purposes, generally for the purpose of blowing chips and the like from machine tools.

The principal object of the invention is to provide an improved blow-gun with a valve which not only can be opened and closed to permit the flow, or stop the flow of air, but is constructed to allow a graduated flow so that the operator can with a simple form of valve, preferably of the plunger type, control the volume and pressure of air directed through the nozzle.

The invention may be briefly summarized as consisting in certain novel details of construction, and combinations and arrangements of parts which will be described in the specification and pointed out in the appended claims.

Figure 1:
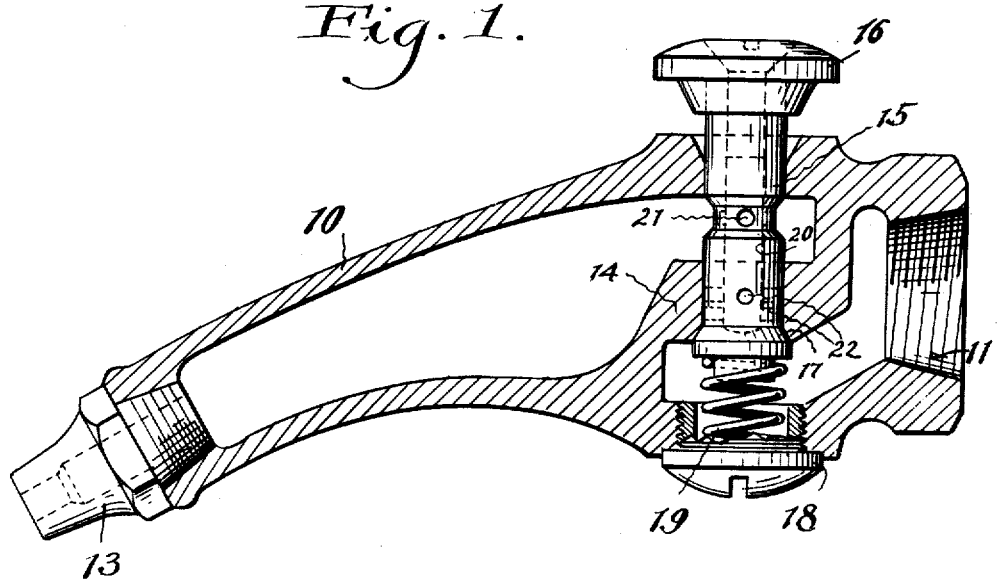
Figure 2:
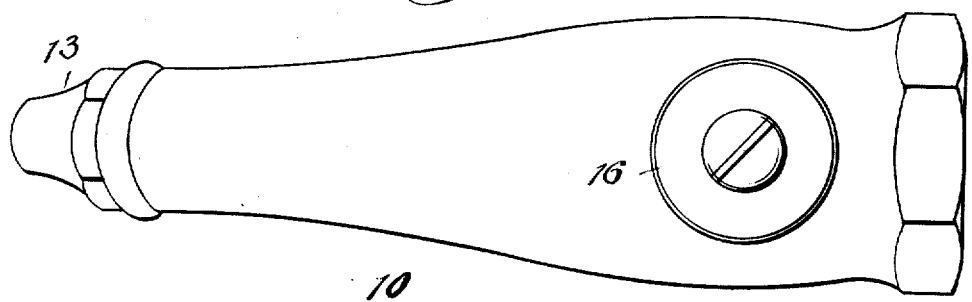

In the accompanying sheet of drawings wherein I have shown the preferred form of my invention, Fig. 1 is a longitudinal sectional view through a blow-gun constructed in accordance with my invention; and Fig. 2 is a top plan view.

The blow-gun consists of a body, preferably in the form of a casting 10 which may be of any suitable configuration or shape, but preferably is elongated and is both tapered and somewhat curved from the inlet end to the discharge end. At the relatively large or inlet end there is a threaded opening 11 for a hose or pipe connection by which air under pressure is supplied to the device. At the opposite or reduced end is a tip or nozzle 13 which is preferably made removable and is generally in the form of a separate device screwed into the end of the blow-gun body 10.

Between the inlet and outlet ends is a valve and a valve seat. The valve seat is formed in the dividing partition or seat member 14, and the valve is preferably in the form of a cylindrical plunger 15 provided at its upper or outer end with a cap or head 16, and at its lower end with a slightly enlarged tapered portion 17 which engages a tapered part of the valve seat. The plunger has bearings in aligned openings in the top of the body 10, and in the seat member 14, the bearing in the latter being rather extended and constituting a part of the valve seat, for as will subsequently appear, the air is not only controlled through the engagement and disengagement of the tapered parts of the valve and seat, but by the closure and opening of ports above the tapered part of the valve by the movement of the valve through the cylindrical opening of the valve seat member.

Below, and in line with the plunger 15 is a removable screw plug 18, forming a seat for a spring 19 which engages the lower end of the valve plunger 15 and normally holds the valve tightly closed so as to prevent the escape of air through the blow-gun.

Extending lengthwise through a portion of the valve plunger there is an inner passageway 20 with outlet openings 21, which are above the seat member 14, or on the outlet side of the valve regardless of the extent to which the plunger is depressed. At and adjacent these outlet ports 21 the plunger is preferably somewhat reduced as shown. At the lower end of the valve plunger, just above the tapered part 17 there are two axially offset series of intake ports 22, one series being located above the other, and both series being closed by the seat member 14 when the valve is closed.

When the tapered part of the valve engages the tapered part of the seat no flow of air through the blow-gun can take place since the intake ports 22 are all closed; but if the operator depresses the plunger so that the lower ports only are opened to the intake side of the valve, a certain volume of air less than the maximum can pass through the blow-gun, and the amount of air passing through can be varied by partially opening or closing the lower series of ports. However, should he depress the valve until both series of ports 22 are exposed, then the maximum volume of air at maximum pressure passes through the blow-gun. Thus the operator is able to control the volume and pressure of the air passing through the outlet or nozzle 13, and this he can do to a nicety by varying the pressure of his thumb or hand on the upper end of the valve. This control is not possible to a material extent with the prior devices whose valves in practice functioned simply to allow the full pressure and volume of air and to shut off the flow entirely.

Certain changes may be made in the construction without materially affecting its operation and without departing from the invention. For example, instead of employing two series of axially offset inlet ports in the cylindrical body of the valve plunger, a single large opening leading from the cylindrical wall of the plunger to the inner axial passageway might be employed. In that event the outer end of the opening would be entirely closed by the seat member when the valve is closed, and it would be gradually uncovered as the plunger is depressed. I prefer, however, to employ the two series of inlet ports 22 substantially as shown.

Having described my invention, I claim:

1. A blow-gun comprising a body having an inlet and an outlet for air, and having between the same a valve and valve seat, the valve being in the form of a hollow plunger with an outlet port and a plurality of axially offset inlet ports adapted to be successively covered and uncovered by the seat.

2. In a blow-gun, a body having inlet and outlet chambers and an intermediate valve seat, a valve movable through the seat and provided with a tapered portion adapted to engage the seat when the valve is closed, and provided with a longitudinal passageway with an outlet on the outlet side of the seat, said outlet adapted to deliver air into said outlet chamber, and provided also with an inlet normally closed by the seat and gradually opened to the inlet side of the seat as the valve is gradually moved from closed position.

3. A blow-gun comprising a body having inlet and outlet ends and having a valve seat between the two, a valve in the form of a plunger with a part adapted to engage the seat when the valve is closed, said valve having an interior passageway with an outlet on the outlet side of the seat, and with inlet ports offset axially different distances from said part of the valve which engages the seat to shut off the flow of air, and adapted to be successively opened as the valve is moved different distances from closed position.

4. A blow-gun comprising a body having inlet and outlet ends and having a valve seat between the two, a valve in the form of a plunger extending through the seat and having a tapered part adapted to engage a correspondingly tapered part of the seat, said valve having an axial passageway with outlet ports on the outlet side of the seat, and inlet ports offset axially of the valve and located different distances from the tapered part thereof, said inlet ports adapted to be successively uncovered as the valve is gradually moved through the seat.

5. In a blow-gun, a body having inlet and outlet chambers and an intermediate seat member, a valve in the form of an endwise movable plunger having a part which engages the seat member when the valve is closed and provided with a passageway with an inlet and an outlet, said outlet adapted to deliver air into said outlet chamber, said seat member having an opening through which the plunger extends and of substantially the size of the latter, the wall of said opening completely covering the inlet of said passageway when the valve is closed and gradually uncovering the same as the plunger is moved through said opening.

6. In a blow-gun, a body having inlet and outlet chambers and an intermediate valve seat comprising a tapered portion adapted to be engaged by one part of the valve when the valve is closed and an extended bearing beyond the tapered portion, a valve in the form of an endwise movable plunger having a tapered end adapted to engage the tapered portion of the seat and having a body portion passing through and engaging the extended bearing of the seat, said plunger having an interior passageway adapted to deliver air into said outlet chamber on the outlet side of the seat and provided also with an inlet at the surface of the body portion of the plunger, said inlet being completely covered and closed when the tapered portions of the seat and valve are in engagement, and being gradually uncovered to permit a graduated flow through the blow-gun as the valve is opened and the body portion thereof is moved through said extended bearing.

In testimony whereof, I hereunto affix my signature.

LOUIS W. GREVE.